JAMES N. BURTON.
Improvement in Combined Planter and Cultivator.
No. 125,018.          Patented March 26, 1872.
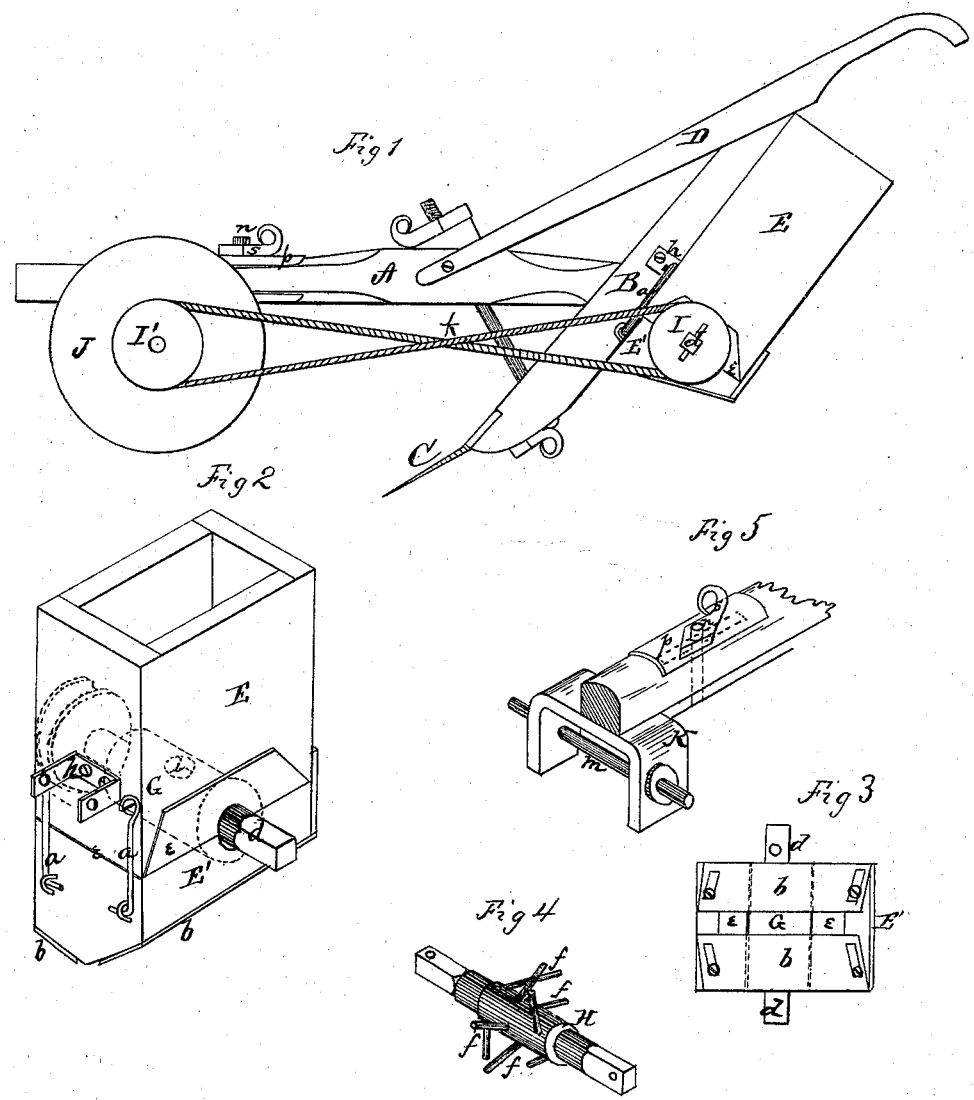

125,018

UNITED STATES PATENT OFFICE.

JAMES N. BURTON, OF GRIFFIN, GEORGIA.

IMPROVEMENT IN COMBINED PLANTERS AND CULTIVATORS.

Specification forming part of Letters Patent No. 125,018, dated March 26, 1872.

*To all whom it may concern:*

Be it known that I, JAMES N. BURTON, of Griffin, in the county of Spalding and in the State of Georgia, have invented certain new and useful Improvements in Corn and Cotton-Planter and Pea-Dropper; and do hereby declare that the following is a full, clear, and exact description thereof, reference being had to the accompanying drawing and to the letters of reference marked thereon making a part of this specification.

The nature of my invention consists in the construction and arrangement of a "corn and cotton-planter and pea-dropper," as will be hereinafter more fully set forth.

In order to enable others skilled in the art to which my invention appertains to make and use the same, I will now proceed to describe its construction and operation, referring to the annexed drawing, in which—

Figure 1 is a side elevation of my machine. Fig. 2 is a perspective view, and Fig. 3 a bottom view of the hopper. Fig. 4 is perspective view of the cotton-seed agitator; and Fig. 5 is a perspective view of a part of the plow-beam, showing the adjustable bracket which holds the driving-wheel.

A represents the plow-beam, to the rear end of which the plow-stock B is firmly secured. To the lower end of this stock the blade C is attached, and at the upper end is attached a cross-bar connecting the handles D. This entire plow may be constructed in any of the known and usual ways, or any plow may be used, as I do not claim anything on the same. E represents the hopper, the lower end E' of which is hinged at the rear side, and fastened at the front by hooks *a a*, as shown in Fig. 2. The extreme lower ends of the front and back of the hopper are beveled or V-shaped, and on the sides thereof are attached two plates, *b b*, which form the bottom of the hopper. The ends of these plates are slotted, as shown in Fig. 3, and screws pass through said slots to fasten the plates, thus making said plates adjustable so as to increase or lessen the space between them, through which space the seed is to pass. In the sides of the hopper E, in the joint between E and E', are formed bearings for the journals *d d* of a roller, G, placed within the hopper, said roller having one or more recesses, *i*, to receive the corn or peas which is to be planted, and by the revolution of said roller is dropped through the space between the plates *b b* into the furrow made by the plow. A plate, *e*, inserted in the hopper, fills up the spaces between the sides of the hopper and said roller.

For planting cotton-seed, the roller G is removed, and in place thereof is substituted the device shown in Fig. 4, consisting of the shaft H with radiating arms *f f*, which, as the shaft revolves, agitate the seed and cause it to drop down to the ground. The entire hopper is attached to the plow-stock B by means of a bracket, *h*, attached to the front side of the hopper and grasping the stock. The ends are fastened by screws, as shown in Fig. 1. The extreme ends of the journals *d d*, both for the roller G and shaft H, are made square, and on the same are placed wheels or pulleys I I, which are connected by twisted cords or belts *k k* with similar wheels or pulleys I' upon a shaft, *m*, which also carries the driving-wheel J. This shaft *m* is placed in a bracket, K, attached to the under side of the plow-beam A by means of a screw-rod, *n*, extending upward from said bracket through a longitudinal slot in the beam, as shown in Fig. 5; then through a plate, *p*, laid on top of the beam, and a thumb-nut, *s*, on the upper end of the rod secures it in position. By means of the slot in the beam the bracket with the shaft, wheel, and pulleys may be moved back and forth so as to tighten or slacken the cords or belts *k k* as may be desired.

Having thus fully described my invention, what I claim as new, and desire to secure by Letters Patent, is—

The combination of the beam A with the plow-standard B, and the detachable and hinged hopper E E with interior plate *e*, and the seed-roller with exterior pulley operated by the wheel J, pulley I, and cord *k*, all as set forth.

In testimony that I claim the foregoing I have hereunto set my hand this 21st day of December, 1871.

JAMES N. BURTON.

Witnesses:
C. L. EVERT,
S. W. MANGHAM.